United States Patent
Nakajo et al.

(10) Patent No.: US 10,276,060 B2
(45) Date of Patent: Apr. 30, 2019

(54) GOLF CLUB DETERMINATION METHOD, GOLF CLUB DETERMINATION DEVICE, AND GOLF CLUB DETERMINATION PROGRAM

(71) Applicant: SEIKO EPSON CORPORATION, Tokyo (JP)

(72) Inventors: Shoichi Nakajo, Matsumoto (JP); Hisao Tanaka, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 10 days.

(21) Appl. No.: 15/110,626

(22) PCT Filed: Mar. 24, 2015

(86) PCT No.: PCT/JP2015/001675
§ 371 (c)(1),
(2) Date: Jul. 8, 2016

(87) PCT Pub. No.: WO2015/146158
PCT Pub. Date: Oct. 1, 2015

(65) Prior Publication Data
US 2016/0335911 A1    Nov. 17, 2016

(30) Foreign Application Priority Data
Mar. 27, 2014   (JP) ................. 2014-066076

(51) Int. Cl.
*A63B 69/36* (2006.01)
*G09B 19/00* (2006.01)

(52) U.S. Cl.
CPC ................ *G09B 19/0038* (2013.01)

(58) Field of Classification Search
CPC .................................................. G09B 19/0038
(Continued)

(56) References Cited

U.S. PATENT DOCUMENTS

| 8,109,816 B1* | 2/2012 | Grober ............... A63B 69/3632 463/3 |
| 8,696,482 B1* | 4/2014 | Pedenko ............ A63B 69/3632 473/221 |

(Continued)

FOREIGN PATENT DOCUMENTS

| JP | 2005-152321 A | 6/2005 |
| JP | 2008-073210 A | 4/2008 |

(Continued)

OTHER PUBLICATIONS

Jun. 2, 2015 Search Report issued in International Patent Application No. PCT/JP2015/001675.

*Primary Examiner* — Nini F Legesse
(74) *Attorney, Agent, or Firm* — Oliff PLC (57) ABSTRACT

To provide a golf club determination method, a golf club determination device, and a golf club determination program capable of automatically determining the type of a golf club by analyzing a swing of the golf club. A golf club determination device includes a measurement unit that measures a posture of a golf club in an address using an output of an acceleration sensor of an inertial sensor mounted on a golf club; and a determination unit that determines the type of the golf club based on the measured posture of the golf club. Another golf club determination device includes a measurement unit that measures a swing of a golf club using an output of an inertial sensor mounted on the golf club, and a determination unit that determines whether the golf club is a putter based on the measured swing.

7 Claims, 7 Drawing Sheets

(58) Field of Classification Search
USPC .................... 473/221–223, 226, 227, 409
See application file for complete search history.

(56) References Cited

U.S. PATENT DOCUMENTS

| | | | | |
|---|---|---|---|---|
| 9,463,366 | B2* | 10/2016 | Kamino | A63B 60/46 |
| 2002/0077189 | A1* | 6/2002 | Tuer | A63B 69/3632 |
| | | | | 473/151 |
| 2003/0008731 | A1* | 1/2003 | Anderson | A63B 24/0003 |
| | | | | 473/407 |
| 2003/0040380 | A1* | 2/2003 | Wright | A63B 57/00 |
| | | | | 473/409 |
| 2004/0259651 | A1* | 12/2004 | Storek | A63B 69/3632 |
| | | | | 473/131 |
| 2011/0028248 | A1* | 2/2011 | Ueda | A63B 69/3614 |
| | | | | 473/409 |
| 2012/0179418 | A1* | 7/2012 | Takasugi | A63B 69/36 |
| | | | | 702/151 |
| 2013/0267339 | A1* | 10/2013 | Boyd | A63B 69/36 |
| | | | | 473/223 |
| 2013/0305806 | A1* | 11/2013 | Saito | A63B 60/46 |
| | | | | 73/11.01 |
| 2014/0357426 | A1* | 12/2014 | Ishikawa | G06K 9/00342 |
| | | | | 473/407 |
| 2015/0018111 | A1* | 1/2015 | Nadkarni | A63B 69/3632 |
| | | | | 473/223 |

FOREIGN PATENT DOCUMENTS

| | | |
|---|---|---|
| JP | 2012-196241 A | 10/2012 |
| JP | 2015-013008 A | 1/2015 |

* cited by examiner

GOLF CLUB DETERMINATION METHOD, GOLF CLUB DETERMINATION DEVICE, AND GOLF CLUB DETERMINATION PROGRAM

TECHNICAL FIELD

The present invention relates to a golf club determination method, a golf club determination device, a golf club determination program, and the like.

BACKGROUND ART

A device in which a sensor unit mounted with an inertial sensor is mounted on a golf club, and an output from the inertial sensor is transmitted to an analysis device (personal computer) and is analyzed to visualize a swing is known (PTL 1).

CITATION LIST

Patent Literature

PTL 1: JP-A-2008-73210

SUMMARY OF INVENTION

Technical Problem

In order to analyze a golf swing, it is necessary that an analysis device knows the type of the golf club, that is, whether the golf club in use is a driver, an iron, or a putter. Golf clubs have different lengths according to the types thereof, and thus, a distance from an inertial sensor mounted on the golf club to a measurement point, for example, to the position of a club head varies.

In the related art, the type of the golf club is input by operating an input device whenever a player exchanges the golf club, and thus, an analysis device obtains the type of the golf club.

However, since the operation is complicated, the type of the golf club may be incorrectly input, and in this case a precise analysis result is not obtained.

An object of some aspects of the invention is to provide a golf club determination method, a golf club determination device, and a golf club determination program capable of automatically determining the type of a golf club by analyzing a swing of the golf club.

Solution to Problem (1) One aspect of the invention relates to a golf club determination method including: measuring a posture of a golf club in an address using an output of an acceleration sensor mounted on the golf club; and determining the type of the golf club based on the measured posture of the golf club.

In the aspect of the invention, a direction in which gravity acts is detected by the acceleration sensor mounted on the golf club which is stationary in the address, and the posture of the golf club is measured based on the direction in which gravity acts. The posture of the golf club in the address is changed depending on the distance from a grip of the golf club to a club head. Accordingly, the type of the golf club can be determined from the posture of the golf club in the address.

(2) Another aspect of the invention relates to a golf club determination method including: measuring a swing of a golf club using an output of an inertial sensor mounted on the golf club; and determining whether the golf club is a putter based on the measured swing.

According to the another aspect of the invention, the swing of the golf club is measured using the output of the inertial sensor mounted on the golf club. During the swinging of the golf clubs, only the putter has a significantly different swing speed or swing width, compared with a driver or an iron. Accordingly, it can be determined whether a club in use is the putter from the swing of the golf club. In other words, since an address posture of the putter is changed between players, in many cases, it is difficult to determine the type of the golf club from the posture of the golf club in the address. Thus, it is possible to determine that the golf club is the putter using the another aspect of the invention.

(3) In the another aspect of the invention, a swing width of the swing of the golf club may be measured using the output of the inertial sensor, and whether the golf club is the putter may be determined based on the measured swing width. Since the swing width is significantly different in the putter compared with the driver or iron, it is possible to reliably determine the putter.

(4) In the another aspect of the invention, the inertial sensor may include an acceleration sensor, and when it is determined that the golf club in use is not the putter, the type of the golf club may be determined based on a posture of the golf club in an address, measured using an output of the acceleration sensor.

As described above, the putter may be determined to be in use based on the swing, but when the driver or the iron is fully swung, since swings at the sensor positions are approximately the same, the golf clubs other than the putter cannot be determined to be in use. Thus, the golf clubs other than the putter are determined to be in use from the posture of the golf club in the address in a similar manner to the one aspect of the invention.

(5) In the one and another aspects of the invention, the determined type of the golf club and the output of the inertial sensor may be associated with each other.

Since the type of the golf club and the output of the inertial sensor are associated with each other, it is possible to output the type of the golf club together with the output of the inertial sensor, or to search with the type of the golf club.

(6) In the one and another aspects of the invention, after the determination of the golf club, information regarding the determined golf club may be read from a storage unit in which information regarding a plurality of golf clubs is stored.

In order to analyze the golf swing, information regarding the club in use, for example, a length from the sensor position to the club head, or the like is necessary. If the type of the golf club in use is determined by the above-described determination method, the information regarding the golf club can be obtained by reading the information from the storage unit.

(7) In the another aspect of the invention, when it is determined that the golf club is the putter, data on the output of the inertial sensor may be thinned out.

The putter has a slower swing speed and a smaller variation per unit of time compared with other golf clubs. Thus, even though data loss occurs by thinning out the data on the output of the inertial sensor, the influence on the swing analysis accuracy is small. Since the amount of swing data decreases by data compression, it is possible to reduce memory capacity of a final storage destination, and thus, it is possible to reduce effort (transmission time or the like) necessary for transmission of the output of the inertial sensor.

(8) In the another aspect of the invention, when it is determined that the golf club in use is the putter, a sampling rate of the output of the inertial sensor may be lowered.

The putter has a slower swing speed and a smaller variation per unit of time compared with other golf clubs. Thus, even though the amount of sampling data is reduced by lowering the sampling rate of the inertial sensor, the influence on the swing analysis accuracy is small. Since the amount of collected data is reduced by lowering the sampling rate, it is possible to reduce memory capacity of a final storage destination, and thus, it is possible to reduce effort (transmission time or the like) necessary for transmission of the output of the inertial sensor.

(9) Still another aspect of the invention relates to a golf club determination device including: a measurement unit that measures a posture of a golf club in an address using an output of an acceleration sensor mounted on the golf club; and a determination unit that determines the type of the golf club in use based on the measured posture of the golf club.

In the still another aspect of the invention, it is possible to preferably implement the golf club determination method described in (1).

(10) Yet another aspect of the invention relates to a golf club determination device including: a measurement unit that measures a swing of a golf club using an output of an inertial sensor mounted on the golf club; and a determination unit that determines whether the golf club in use is a putter based on the measured swing.

In the yet another aspect of the invention, it is possible to preferably implement the golf club determination method described in (2).

(11) Still yet aspect of the invention relates to a golf club determination program that causes a computer to execute a procedure including: a process of measuring a posture of a golf club in an address using an output of an acceleration sensor mounted on the golf club; and a process of determining the type of the golf club based on the measured posture of the golf club.

In the still yet another aspect of the invention, it is possible to preferably implement the golf club determination method described in (1), or to implement the golf club determination device described in (9) as software.

(12) Further another aspect of the invention relates to a golf club determination program that causes a computer to execute a procedure including: a process of measuring a swing of a golf club using an output of an inertial sensor mounted on the golf club; and a process of determining whether the golf club is a putter based on the measured swing.

In the further another aspect of the invention, it is possible to preferably implement the golf club determination method described in (2), or to implement the golf club determination device described in (10) as software.

DESCRIPTION OF EMBODIMENTS

Hereinafter, embodiments of the invention will be described with reference to the accompanying drawings. The embodiments which will be described hereinafter do not improperly limit the content of the invention disclosed in the appended claims, and the entirety of configurations described in the embodiments are not essential as means of solving the invention.

(1) Swing Analysis System and Swing Analysis Device

Figure 1:
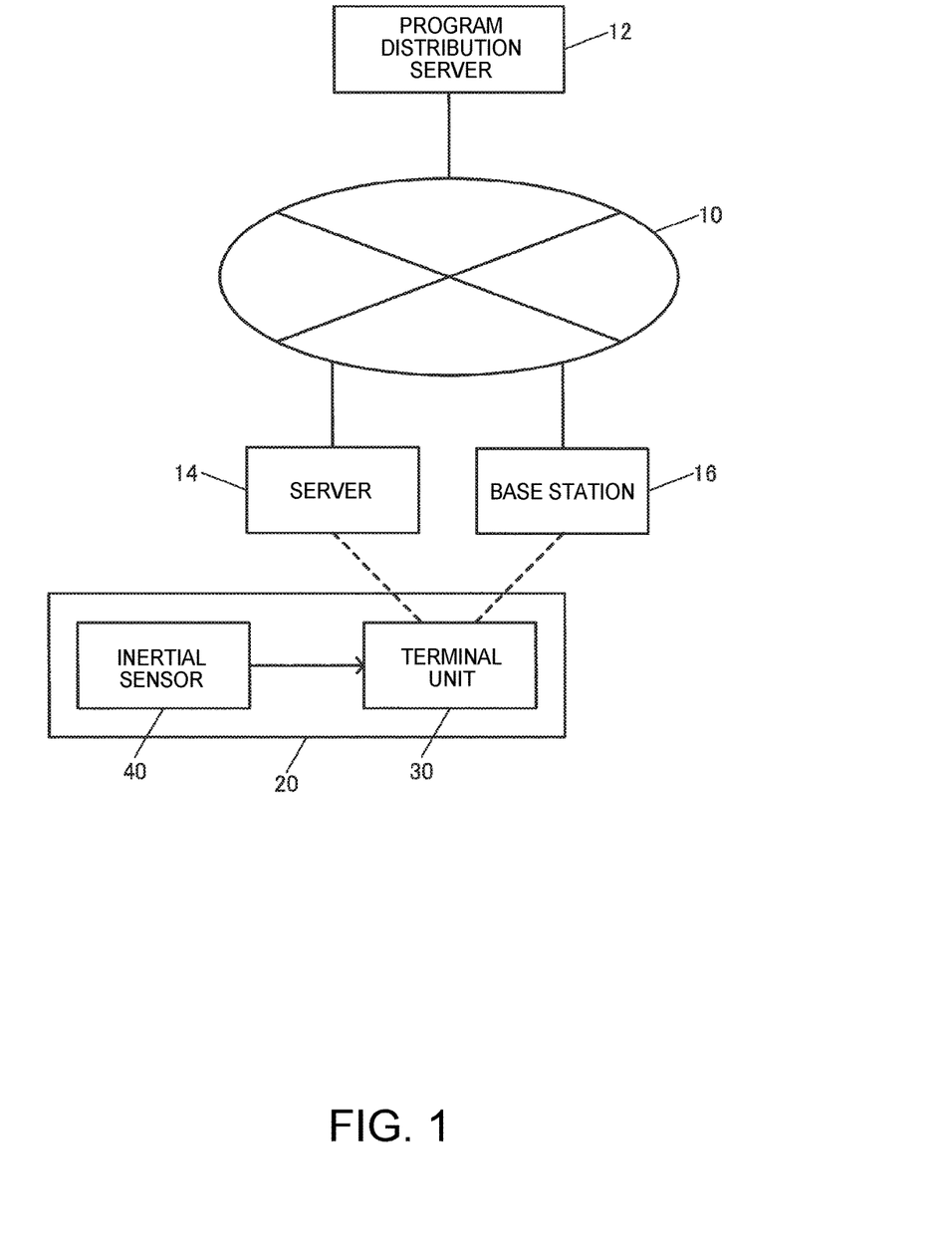
FIG. 1 is a general view illustrating a swing analysis system according to one embodiment of the invention.

FIG. 1 is a general view illustrating a swing analysis system in which the invention is applied to golf swing analysis, for example. As shown in FIG. 1, servers 12 and 14, a base station 16, and the like are connected to a network, for example, the internet 10. The server 12 is a program distribution server that distributes a golf club determination program, a swing analysis program or the like.

A terminal device 30 is configured as a portable terminal such as a mobile phone capable of communicating with the program distribution server 12 through the base station 16 and the internet 10, a personal computer capable of communicating with the program distribution server 12 through the server 14 and the internet 10, or the like. A swing analysis device 20 is composed of the terminal device 30 and an inertial sensor 40 mounted on at least one of an operator (player) and a golf club which are detection targets. In a storage unit of the terminal device 30, a golf club determination program or a swing analysis program downloaded from the program distribution server 12 is stored.

Figure 2:
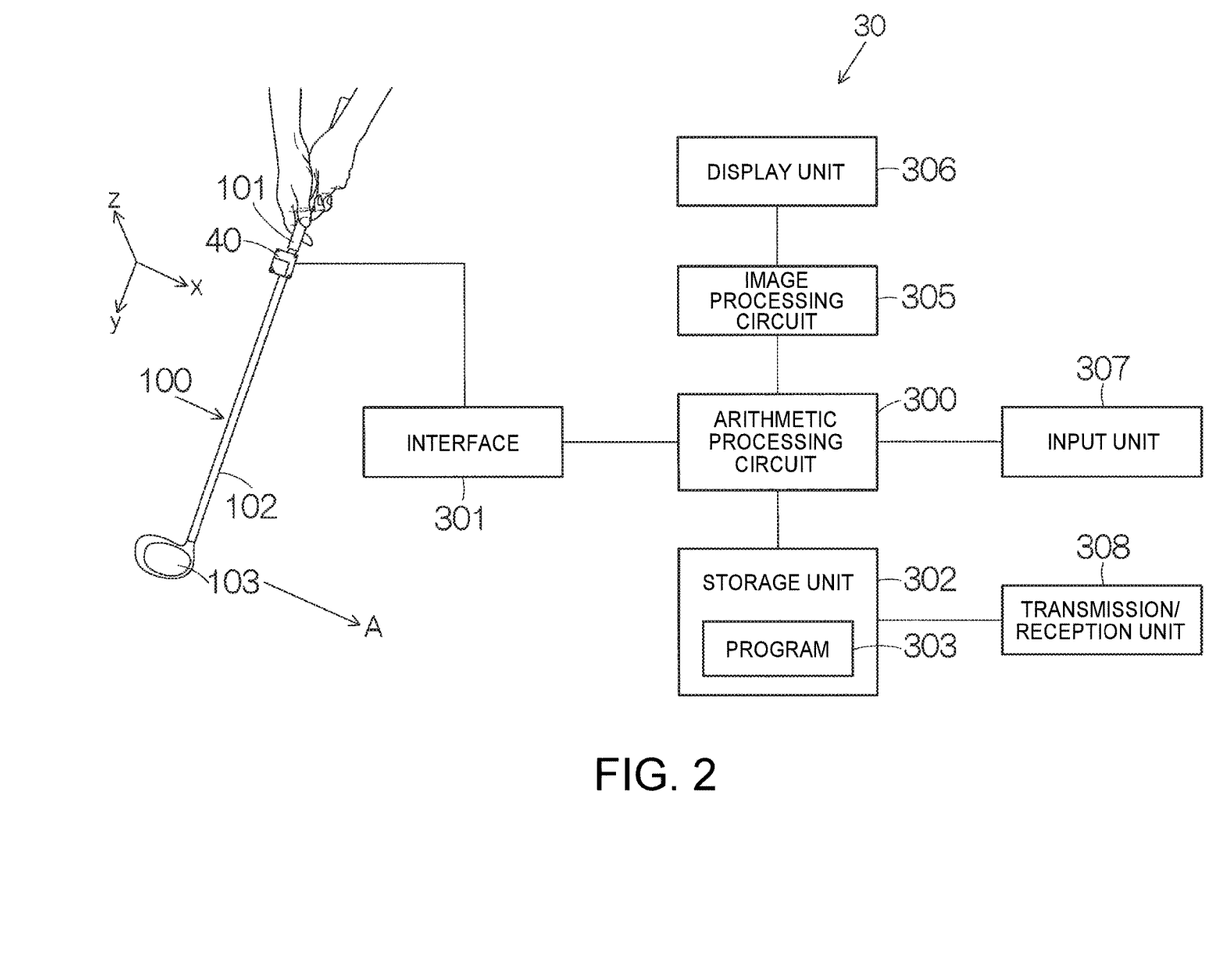
FIG. 2 is a block diagram illustrating a swing analysis device according to the one embodiment of the invention.

In the inertial sensor 40, for example, an acceleration sensor or a gyro sensor (angular velocity sensor) is assembled. The acceleration sensor may individually detect accelerations in directions of three axes x, y, and z that are orthogonal to each other as shown in FIG. 2. The gyro sensor may individually detect an angular velocity around each axis of the three axes x, y, and z that are orthogonal to each other. The inertial sensor 40 outputs detection signals of the acceleration and the angular velocity for each axis. The y axis matches an axial direction of a shaft 102, and the x axis matches a striking direction A.

The inertial sensor 40 is attached to a golf club (sporting goods) 100, for example, as shown in FIG. 2. The golf club 100 includes a grip 101 and a shaft 102. A golf club head 103 is connected to the tip of the shaft 102. The inertial sensor 40 is attached to the grip 101 or the shaft 102 of the golf club 100.

The terminal device 30 includes an arithmetic processing circuit 300. The inertial sensor 40 is connected to the arithmetic processing circuit 300 through an interface 301. The interface 301 is connected to the inertial sensor 40 in a wired or wireless manner. The detection signals are supplied to the arithmetic processing circuit 300 from the inertial sensor 40.

A storage unit 302 is connected to the arithmetic processing circuit 300. In the storage unit 302, for example, a program 303 such as a golf club determination program or a swing analysis program and swing data (data from the inertial sensor 40 and analysis data thereof) are stored. The program 303 is downloaded from the program distribution server 12 for storage. The arithmetic processing circuit 300 executes the golf club determination program to determine the type of a golf club in use. The arithmetic processing circuit 300 executes the golf club analysis program to implement golf swing analysis. The storage unit 302 may include a DRAM (dynamic random access memory), a large capacity storage unit, a non-volatile memory, or the like. For example, the above-described program 303 is retained in the DRAM. When the terminal device 30 includes a large capacity storage unit called a hard disk drive (HDD), the program 303 and data may be retained in the HDD. A relatively small capacity program or data called a basic input/output system (BIOS) is stored in the non-volatile memory.

The image processing circuit 305 is connected to the arithmetic processing circuit 300. The arithmetic processing circuit 300 transmits predetermined image data to the image processing circuit 305. The image processing circuit 305 is connected to a display device 306. A predetermined interface circuit (not shown) is connected to the image processing circuit 305. The image processing circuit 305 transmits an image signal to the display device 306 according to input image data. An image specified by the image signal is displayed on a screen of the display device 306. A liquid crystal display or a flat panel display is used as the display device 306. Here, the arithmetic processing circuit 300, the storage unit 302, and the image processing circuit 305 are provided as a computer device, for example.

An input device 307 is connected to the arithmetic processing circuit 300. The input device 307 includes alphabet keys and ten keys, for example. Character information or numerical information is input to the arithmetic processing circuit 300 through the input device 307. Further, a transmission/reception unit 308 is connected to the storage unit 302. The transmission/reception unit 308 receives a program through the internet 10, or transmits collected swing data.

(2) Golf Club Determination Device

Figure 3:
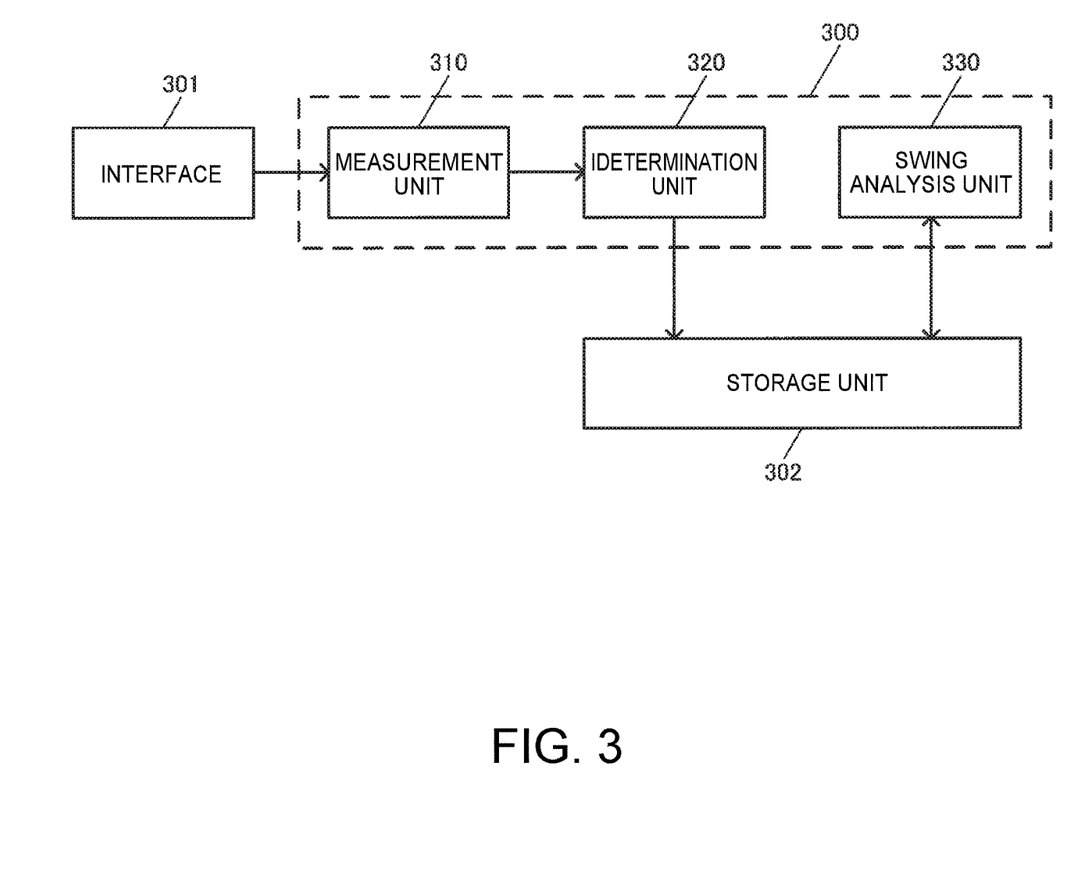
FIG. 3 is a block diagram illustrating an arithmetic processing circuit shown in FIG. 2 including a golf club determination device.

As shown in FIG. 3, the arithmetic processing circuit 300 including the golf club determination device includes a measurement unit 310 that measures the posture of the golf club 100 in an address using an output of the acceleration sensor of the inertial sensor 40, and a determination unit 320 that determines the type of the golf club 100 based on the measured posture of the golf club 100. It should be noted that the measurement unit 310 may receive, as an input, the output of the acceleration sensor in the address through the interface 301 in real time, or may receive the output from the storage unit 302. The arithmetic processing circuit 300 may include a swing analysis unit 330.

Figure 4:
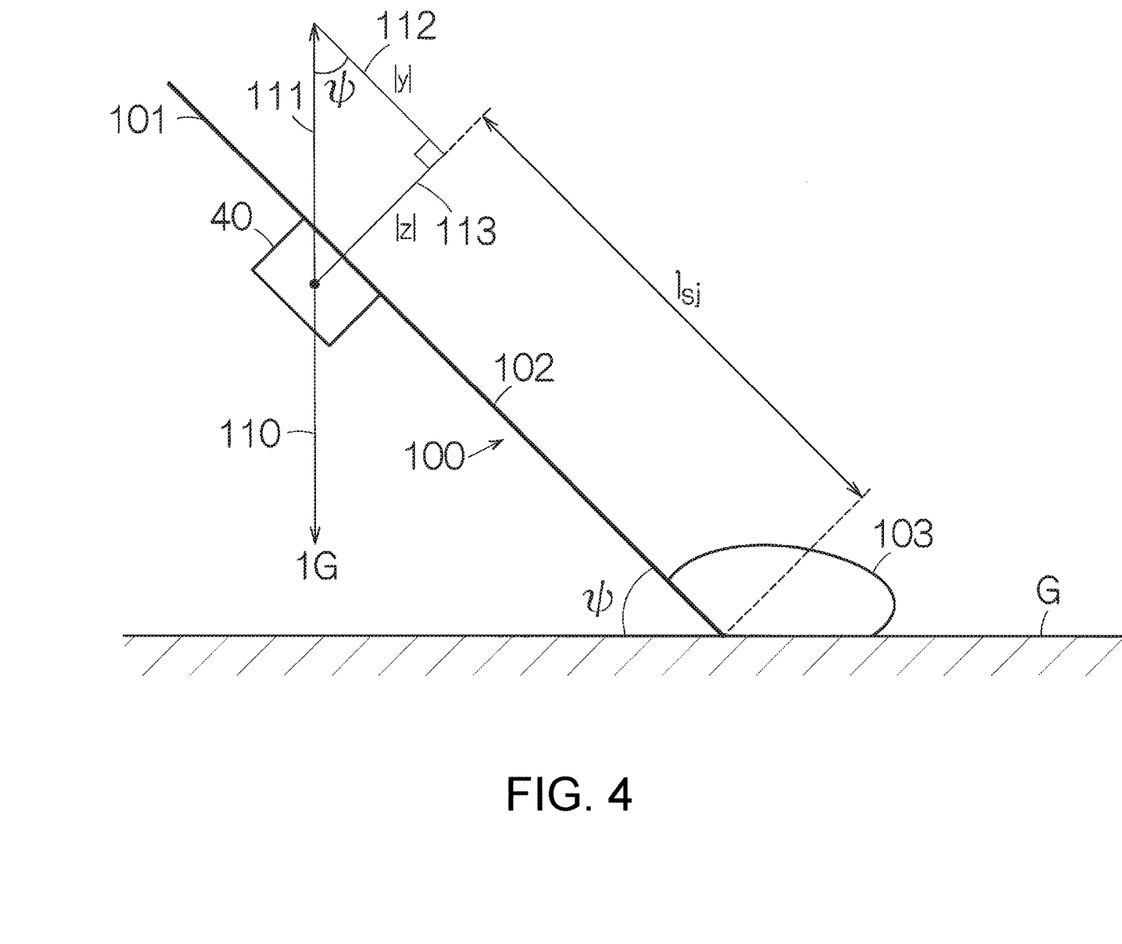
FIG. 4 is a diagram illustrating a principle of detecting a posture of a golf club in an address.

Here, FIG. 4 shows the principle of measuring the posture of the golf club 100 in the address. In FIG. 4, the shaft 102 that is stationary in the address is shown. The acceleration sensor of the inertial sensor 40 mounted on the grip 101 of the golf club 100 or the shaft 102 is fixed to the golf club 100 so that one of the three detection axes, for example, the y axis, matches the longitudinal direction of the shaft 102.

An upward force 111 opposite to gravity 110 pressing downward acts on the inertial sensor 40. The acceleration sensor of the inertial sensor 40 divides the upward force 111 acting by the gravity 110 into a first force component 112 along the longitudinal (y axis) direction of the shaft 102 and a second force component 113 of an axis (z axis) orthogonal to the longitudinal direction of the shaft 102 on the sheet of FIG. 4 for measurement. The measurement unit 310 calculates a tilt angle φ of the longitudinal direction of a shaft 102a with respect to the direction in which gravity acts using a trigonometric function including the force components 112 and 113 which are outputs of the y axis and z axis acceleration sensors in the address. Here, the force component 112 corresponds to an acceleration vector (=|y|) in the shaft longitudinal direction (y axis direction), and the force component 113 corresponds to an acceleration vector (=|z|) in the direction (z axis direction) orthogonal to the acceleration vector.

$$\varphi = \tan^{-1} \frac{|z|}{|y|} \qquad [\text{Math. 1}]$$

Here, the angle φ of the shaft 102 in the address is changed depending on a length lsj of the club head 103 from a sensor position shown in FIG. 4, that is, the type of the golf club 100. Since a grip position of the same golfer in the address maintains an approximately constant height, when the length lsi is long, the angle φ in the address is small, and when the length lsi is short, the angle φ in the address is large. The angle φ of No. 1 wood (driver) with the longest length lsi in the address is small, the angle φ of a sand wedge, for example, with the shortest length lsi among irons in the address is large.

The determination unit 320 to which the output of the measurement unit 310 is input determines the type of the golf club 100 corresponding to the input angle φ based on a table in which a range of the angle φ for each type of the golf club 100 is stored in advance. The table may be provided in the storage unit 302. Address postures (angles φ) of the entire golf clubs 100 may be measured in advance based on the above-mentioned principle with respect to a golfer, and the table may be prepared based on the measurement result. When plural persons commonly use the swing analysis device 20, the table may be prepared for each golfer. In this case, the golfer who uses the swing analysis device 20 inputs the golfer's individual ID through the input device 307, for example.

The determination unit 320 may associate the determined type of the golf club 100 with the output of the inertial sensor 40 to be stored in the storage unit 302. Preferably, the type of the golf club 100 in addition to a player ID, a start time and the like is stored in a header of data (x, y and z axes outputs of the acceleration sensor at each time and x, y and z axes outputs of the gyro sensor) output from the inertial sensor 40 during one swing. Thus, the type of the golf club 100 can be used as a retrieval item.

The determination unit 320 may read information relating to the club in use from the storage unit 302 based on the determined type of the golf club 100. In this case, the storage unit 302 stores the length lsj from the sensor position shown in FIG. 4 to the club head 103, for example, as the information regarding the golf club 100 for each type of the golf club 100. The determination unit 320 may read the information regarding the length lsj necessary for swing analysis in the swing analysis unit 330 from the storage unit 302, and may input the information to the swing analysis unit 330.

The swing analysis unit 330 may calculate an acceleration $\alpha_{sj}$ at the position of the club head 103 based on the following expression, for example. The swing analysis unit 330 obtains an acceleration output as, an angular velocity output $\omega_s$, and the length $l_{sj}$ which are outputs of the inertial sensor 40 from the storage unit 302. An angular acceleration (expressed by affixing a dot above $\omega_s$ in the following expression) is obtained by differentiating the angular velocity output $\omega_s$.

$$\alpha_{sj} = \alpha_s + \dot{\omega}_s \times l_{sj} + \omega_s \times (\omega_s \times l_{sj}) + g \quad \text{[Math. 2]}$$

The swing analysis unit 330 may calculate a moving velocity of the club head 103 based on the calculated acceleration. Here, integration is performed with respect to the acceleration at a regulated sampling interval dt according to the following expression.

$$V_{sj}(0) = 0 \quad \text{[Math. 3]}$$
$$V_{sj}(t) = \sum_{n=1}^{t} \alpha_{sj}(n) \cdot dt \ (t = 1, \ldots, N)$$

Further, the swing analysis unit 330 may calculate the position of the club head 103 based on the calculated velocity. Here, integration is performed with respect to the velocity at a regulated sampling interval dt according to the following expression.

$$P_{sj}(t) = \sum_{n=1}^{t} V_{sj}(n) \cdot dt \ (t = 1, \ldots, N) \quad \text{[Math. 4]}$$

(3) Another Golf Club Determination Device

Figure 5:
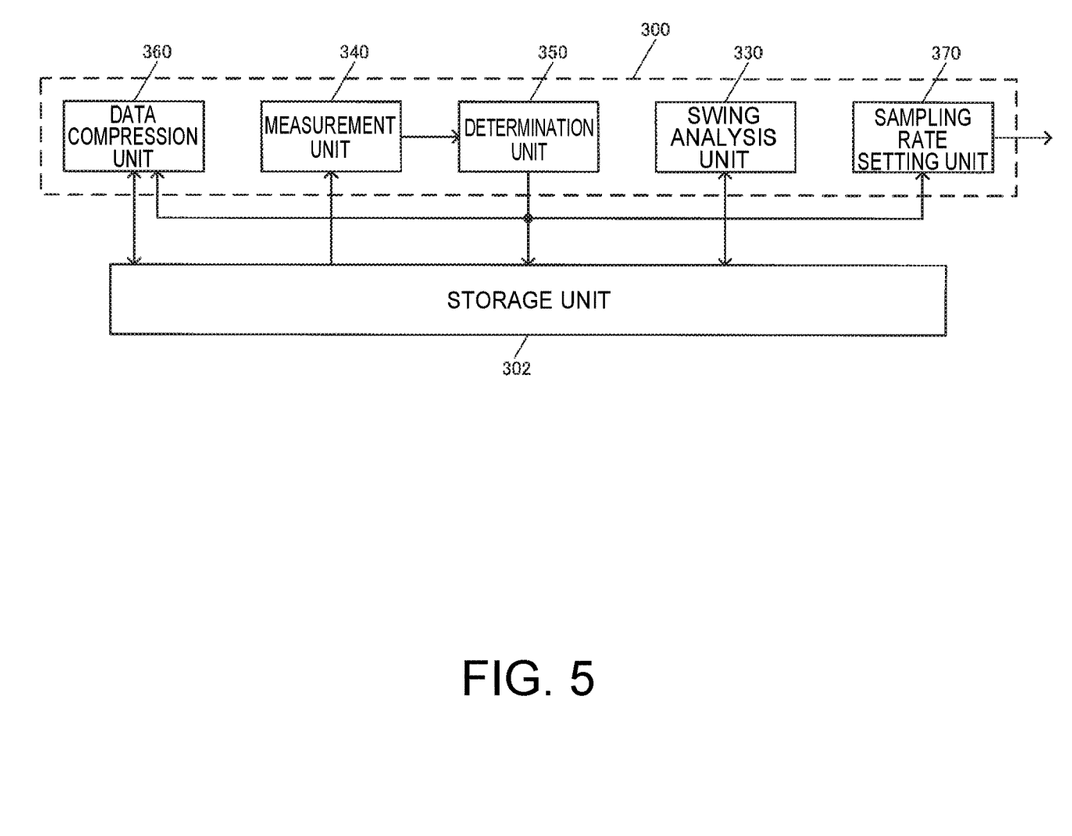
FIG. 5 is a block diagram illustrating the arithmetic processing circuit shown in FIG. 2 including another golf club determination device.

FIG. 5 is a block diagram illustrating the arithmetic processing circuit 300 shown in FIG. 2 including another golf club determination device. In FIG. 5, the arithmetic processing circuit 300 includes a measurement unit 340 that measures a swing of the golf club 100 using the output of the inertial sensor (acceleration sensor and gyro sensor) 40 mounted on the golf club 100, and a determination unit 350 that determines whether the golf club 100 is a putter based on the measured swing. The arithmetic processing circuit 300 may further include a swing analysis unit 330, a data compression unit 360, and a sampling rate setting unit 370.

Figure 6:
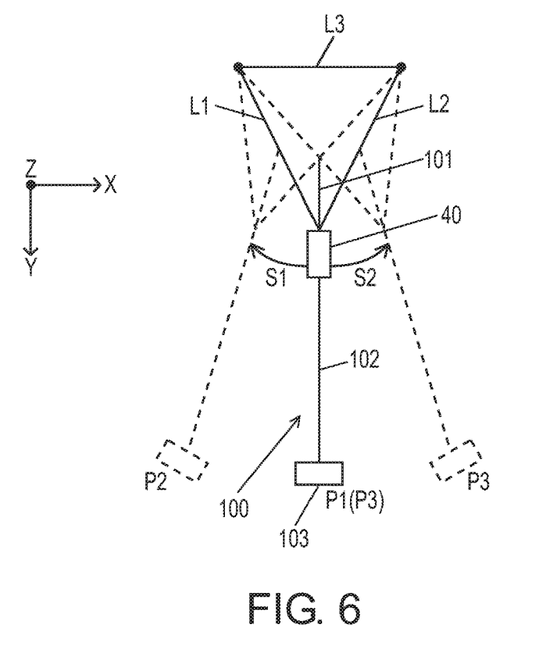
FIG. 6 is a diagram schematically illustrating a swing of a putter.

FIG. 6 schematically illustrates a swing when the putter is used as the golf club 100. Generally, the putter is slowly swung with a relatively narrow swing width (S1+S2 in FIG. 6, in which S1 represents a take-back stroke from an address position, and S2 represents a follow-through stroke from the address position) while maintaining a triangle formed by a line segment L1 that connects a right shoulder to a grip position, a line segment L2 that connects a left shoulder to the grip position, and a line segment L3 that connects both the shoulders, and thus, is totally different from full swing of another golf club (wedge or iron) shown in FIG. 7. It should be noted that, in FIGS. 6 and 7, a position P1 represents an address position, and a position P2 represents a top, a take-back terminating position or a turn position, a position P3 represents an impact position, and a position P4 represents a finishing position or a follow-through terminating position.

The measurement unit 340 measures characteristics of a putter-specific swing. Thus, the measurement unit 340 may be substituted by the swing analysis unit 330. For example, since the swing width of the putter is extremely narrow, the measurement unit 340 calculates the take-back terminating position P1 and/or the follow-through terminating position P4 which are two positions indicated by broken lines in FIG. 6 by converting the position calculated from the above-described Math. (4) into an absolute coordinate system $\Sigma XYZ$ shown in FIG. 6 (here, $l_{sj}$=0 or a constant value), for example. The take-back terminating position P1 and the follow-through terminating position P4 which are two positions indicated by the broken lines in FIG. 6 are calculated using the fact that their velocities are zero, or the like. The take-back terminating position P1 and the follow-through terminating position P4 are located so that the putter is at an extremely low position compared with other golf clubs. Accordingly, the determination unit 350 that receives the output of the measurement unit 340 as an input may determine that the golf club is the putter when the measured position, for example, the height in the Y direction is smaller than a predetermined value. Alternatively, the measurement unit 340 may calculate the swing width S1+S2 from the take-back terminating position P2 to the follow-through terminating position P4, and the determination unit 350 may determine that the golf club is the putter when (S1+S2)<S. The swing width S1+S2 may be calculated by accumulating distances between sampling points, from the take-back terminating position P2 to the follow-through terminating position P4, for example. Alternatively, the measurement unit 340 may calculate a maximum velocity (here, $l_{sj}$ is 0 or a constant value) calculated from the Math. (2), and the determination unit 350 may determine that the golf club is the putter when the maximum velocity is equal to or lower than a predetermined value.

Here, as described above, the information from the determination unit 350 indicating that the golf club in use is the putter is stored in the storage unit 302 in association with the output data of the inertial sensor 40 or the analysis data in the swing analysis unit 330, and is used in reading of the information (distance $l_{sj}$ from the sensor position to the head, or the like) on the putter stored in the storage unit 302.

Further, the information from the determination unit 350 indicating that the golf club in use is the putter may be input to the data compression unit 360. The data compression unit 360 compresses the output data of the inertial sensor 40 mounted on the putter. A swing velocity of the club head 103 of the golf club 100 other than the putter is 30 m/s to 50 m/s, but a head speed of the putter is several m/s or less. Since a variation per unit of time is large in a high speed swing, a relatively large amount of data is necessary for analysis, but since a variation per unit time is small in a low speed swing, the analysis accuracy is not lowered even though the amount of data is small.

The data compression unit 360 may thin out the data read from the storage unit 302, and then may store the data in the storage unit 302, to thereby compress the data. Thinning out one of N pieces of swing data (N≥2) that are consecutive in a time series with respect to one swing is referred to as a thinning rate N. For example, when thinning out one of two (N=2) pieces of swing data that are consecutive in a time series, if the thinning rate N is 2, the amount of data with respect to one swing of the putter is compressed to ½. With the above-described data compression, the memory capacity of the server 12 or server 14 to which the swing data is transmitted from the terminal device 30 can be reduced. In addition, the amount of swing data transmitted by the transmission/reception unit 308 or the total amount of swing data transmitted through the internet 10 can be reduced, and thus, the data transmission time can be reduced.

Further, the information from the determination unit 350 indicating that the golf club in use is the putter may be input to the sampling rate setting unit 370. The sampling rate setting unit 370 sets a sampling rate of the inertial sensor 40. Information regarding the set sampling rate is supplied to the inertial sensor 40 through the interface 301. The inertial sensor 40 normally employs a fixed sampling rate (for example, 1 kHz), but may lower the sampling rate using a command from the terminal device 30. For example, the sampling rate (for example, 1 kHz) may not be changed with respect to golf clubs other than the putter, but when the swing velocity is extremely slow as in the putter, the sampling rate is lowered to 500 Hz, for example. If the sampling rate is lowered, the amount of swing data sampled during one swing is reduced. For example, when the sampling rate is set to 500 kHz, the amount of data is reduced by half. Accordingly, thereafter, if the inertial sensor 40 performs sampling according to the changed sampling rate, the data compression in the data compression unit 360 may not be performed.

(4) Still Another Golf Club Determination Device

Figure 7:
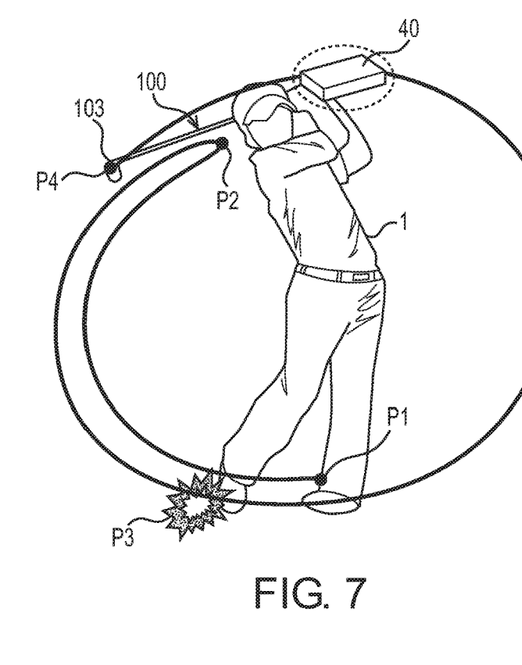
FIG. 7 is a diagram illustrating a swing of a golf club other than the putter.
Figure 8:
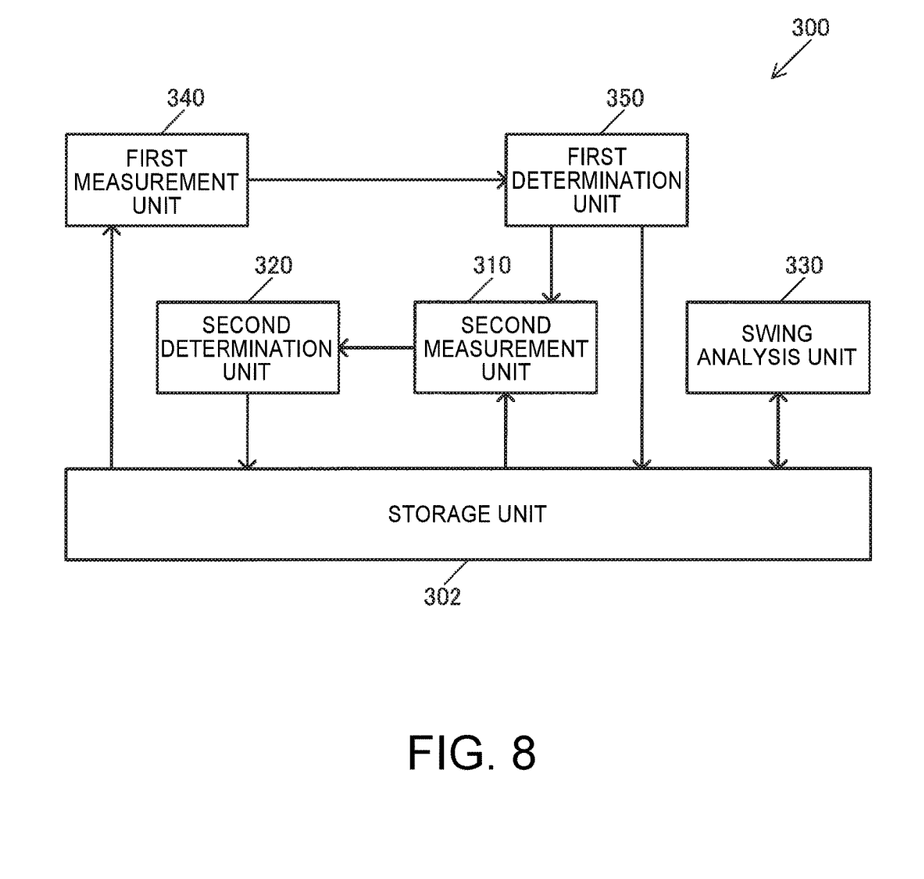
FIG. 8 is a block diagram illustrating the arithmetic processing circuit shown in FIG. 2 including still another golf club determination device.

FIG. 8 is a block diagram illustrating the arithmetic processing circuit 300 shown in FIG. 2 including another golf club determination device. In FIG. 7, the same reference numerals are given to the same members indicating the same function as the members shown in FIGS. 4 and 5. In FIG. 7, the arithmetic processing circuit 300 includes the first and second measurement units 340 and 310, and the first and second determination units 350 and 320. The arithmetic processing circuit 300 may further include the swing analysis unit 330. The first measurement unit 340 measures the swing of the golf club 100. The first determination unit 350 determines whether the golf club 100 is the putter based on the swing measured by the first measurement unit 340. When the golf club 100 in use is not the putter, the second measurement unit 310 to which a signal from the first determination unit 350 is input measures the posture of the golf club 100 using the output of the acceleration sensor in the address. The second measurement unit 320 determines the type of the golf club 100 based on the posture of the golf club 100 measured by the second measurement unit 310. Then, it is determined by the first determination unit 350 that the golf club in use is the putter or a club other than the putter. If it is determined by the first determination unit 350 that the golf club is a golf club other than the putter, the second measurement unit 310 measures the posture of the golf club 100 in the address, and the second determination unit 320 determines the type of the golf club 100 not to be the putter. It should be noted that the data compression unit 360 and/or the sampling rate setting unit 370 shown in FIG. 5 may be provided in the arithmetic processing circuit 300 shown in FIG. 8.

As described above, the embodiments have been described in detail, but it can be easily understood by those skilled in the art that various modifications can be made in a range without substantially departing from the new subject matter and effects of the invention. Accordingly, such modifications are included in the scope of the invention. For example, in the specification or drawings, terminology used at least once together with different terminology having a wider meaning or the same meaning may be replaced with the different terminology in any location of the description and the drawings.

REFERENCE SIGNS LIST

1: golfer
20: swing analysis device
30: terminal device
40: inertial sensor
100: golf club
101: grip
102: shaft
103: club head
300: arithmetic processing circuit
302: storage unit
310: measurement unit (second measurement unit)
320: determination unit (second measurement unit)
330: swing analysis unit
340: measurement unit (first measurement unit)
350: determination unit (first determination unit)
360: data compression unit
370: sampling rate setting unit The entire disclosure of Japanese Patent Application No. 2014-066076 filed Mar. 27, 2014 is expressly incorporated by reference herein.

The invention claimed is:

1. A golf club determination method comprising:
measuring a posture of a golf club in an address position using an output of an acceleration sensor of a tri-axial inertial sensor mounted on the golf club, an axis of the tri-axial inertial sensor being set to correspond to a longitudinal direction of a shaft of the golf club, the measuring of the posture of the golf club includes receiving information of an upward force opposite to gravity pressing downward, and dividing the upward force into a first force component along the longitudinal direction of the shaft of the golf club and a second force component of an axis orthogonal to the longitudinal direction, and calculating a tilt angle of the longitudinal direction of the shaft with respect to the direction in which gravity acts; and
determining the type of the golf club in use including whether the golf club in use is a putter based on the measured posture of the golf club utilizing the calculated tilt angle and without user input of the type of the golf club.

2. The golf club determination method according to claim 1, wherein,
when it is determined that the golf club in use is not the putter, determining the type of the golf club based on a posture of the golf club in an address, measured using an output of the acceleration sensor.

3. The golf club determination method according to claim 1, wherein the method further comprises:
associating the determined type of the golf club and the output of the inertial sensor with each other.

4. The golf club determination method according to claim 1, wherein the method further comprises:
after the determination of the type of golf club, reading, from a storage unit in which information regarding a plurality of golf clubs is stored, information regarding the determined type of golf club.

5. The golf club determination method according to claim 1, wherein the method further comprises:
when it is determined that the golf club in use is the putter, decreasing data on the output of the inertial sensor.

6. The golf club determination method according to claim 1, wherein the method further comprises:
when it is determined that the golf club in use is the putter, lowering a sampling rate of the output of the inertial sensor.

7. A golf club determination device comprising:
a measurement unit that measures a posture of a golf club in an address position using an output of an acceleration sensor of a tri-axial sensor mounted on the golf club, an axis of the tri-axial inertial sensor being set to correspond to a longitudinal direction of a shaft of the golf club, the measuring of the posture of the golf club including receiving information of an upward force opposite to gravity pressing downward, and dividing the upward force into a first force component along the longitudinal direction of the shaft of the golf club and a second force component of an axis orthogonal to the longitudinal direction, and calculating a tilt angle of the longitudinal direction of the shaft with respect to the direction in which gravity acts; and a determination unit that determines the type of the golf club in use including whether the golf club is a putter based on the measured posture of the golf club utilizing the calculated tilt angle and without user input of the type of the golf club.

* * * * *